(12) United States Patent
Collomosse et al.

(10) Patent No.: US 8,180,163 B2
(45) Date of Patent: May 15, 2012

(54) ENCODER AND DECODER AND METHODS OF ENCODING AND DECODING SEQUENCE INFORMATION WITH INSERTED MONITOR FLAGS

(75) Inventors: John Collomosse, Bath Avon (GB); Timothy Paul James Gerard Kindberg, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 963 days.

(21) Appl. No.: 12/179,935

(22) Filed: Jul. 25, 2008

(65) Prior Publication Data
US 2009/0028238 A1 Jan. 29, 2009

(30) Foreign Application Priority Data

Jul. 27, 2007 (GB) .................................. 0714664.0

(51) Int. Cl.
*G06K 9/36* (2006.01)
(52) U.S. Cl. .................. 382/232; 235/462.1; 235/462.09
(58) Field of Classification Search ............... 235/462.1, 235/462.11, 462.25; 345/87, 716; 359/32; 369/103; 370/390; 380/255; 382/238, 265, 382/306
See application file for complete search history.

(56) References Cited

U.S. PATENT DOCUMENTS

| 3,813,485 | A  | * | 5/1974  | Arps .............................. 382/238 |
| 6,201,901 | B1 | * | 3/2001  | Zhou et al. ..................... 382/306 |
| 6,814,291 | B1 | * | 11/2004 | Cordery et al. .......... 235/462.25 |
| 6,941,026 | B1 | * | 9/2005  | Nadabar et al. ............... 382/265 |
| 7,006,497 | B2 | * | 2/2006  | Dove et al. ..................... 370/390 |
| 2004/0125125 | A1 | * | 7/2004  | Levy .............................. 345/716 |
| 2007/0139321 | A1 | * | 6/2007  | Takemoto et al. .............. 345/87 |
| 2007/0187507 | A1 | * | 8/2007  | Natsume et al. ........... 235/462.1 |
| 2007/0272755 | A1 | * | 11/2007 | Chang et al. ............. 235/462.11 |
| 2009/0161519 | A1 | * | 6/2009  | Yamamoto et al. ........... 369/103 |
| 2010/0020970 | A1 | * | 1/2010  | Liu et al. ....................... 380/255 |
| 2010/0103491 | A1 | * | 4/2010  | Hashimoto et al. ............. 359/32 |

FOREIGN PATENT DOCUMENTS
EP 1503327 2/2005
WO WO 2004/006456 1/2004

OTHER PUBLICATIONS

Sexena, N., et al., "Secure device pairing based on a visual channel," IACR Cryptology ePrint Archive: Report 2006/050, Feb. 2006.*

* cited by examiner

*Primary Examiner* — Vu Le
*Assistant Examiner* — Xuemei Chen

(57) ABSTRACT

The present disclosure describes encoding sequence information into a sequence of display frames for display on a display device. An example of encoding sequence information includes generating the sequence of display frames, inserting monitor flags within each display frame, each monitor flag being capable of moving between a first state and a second state, setting the state of monitor flags within each display frame to a predetermined configuration, and encoding sequence information in the sequence of display frames such that neighboring display frames in the sequence have different predetermined configurations.

15 Claims, 4 Drawing Sheets

ENCODER AND DECODER AND METHODS OF ENCODING AND DECODING SEQUENCE INFORMATION WITH INSERTED MONITOR FLAGS

TECHNICAL FIELD

The present invention relates to an encoder and a decoder and methods of encoding and decoding sequence information.

BACKGROUND TO INVENTION

Image sequences may be transmitted between video displays for passive capture by a camera equipped device. Such transmissions may also encode data within the video image sequence. Data bits may also be presented in an image format, e.g. an animated rectangular grid pattern of black and white cells, to effect data transfer between a video display and a separate camera equipped device passively observing that display.

Transmitting data over such a display-to-device channel is complicated by the potential for (a) dropped frames, (b) a partially refreshed display when sampling, and (c) general environmental noise. For image sequences that loop continuously it can also be difficult to detect the start and end of the image sequence.

Consider a display refreshing at D Hertz (Hz), containing encoded data animating at C Hz. The camera frame rate is R Hz. The following error cases may arise:—

Case (a): Dropped Frames.

The Nyquist limits of the display and camera are D/2 and R/2 respectively. If C>D/2, D>R/2, or C>R/2 then it is likely that the camera will fail to image a subset of frames, i.e. frames will be "dropped".

The frequency of frame dropping is proportional to C/D, D/R and C/R but in practice C/R is the significant factor on typical equipment. Frames may also be dropped due to external factors such as misregistration of an encoded image or the environment (e.g. disruption of the line of sight between display and camera).

Case (b): Partial Refresh.

If a (raster) video display is refreshed at D Hz from top to bottom by a scanline sweep, it is possible that, at the instant when the camera samples the image, the display is only partially refreshed i.e. half the image data displayed is from the previous frame, and half is from the current (new) frame. For practical purposes, the rate at which this phenomenon occurs is proportional to the size of the image frame on the screen (typically affecting approximately 1% of frames), with insignificant correlation to D and R on typical equipment.

Case (c) Garbled Frame.

Occasionally, displayed frames will become garbled e.g. due to the camera sampling its image in the 'idle' (dim) phase of the display refresh cycle, or due to environmental factors. The rate of this phenomenon is typically constant and independent of D, R and C.

Furthermore, when transmitting a continuously looped sequence of images, it is desired to ascertain SYNCHRONIZATION conditions relating to the sequence. For a sequence of frames that are displayed in continuous cycle, it is desirable to signal out-of-band which of these frames has the attribute of being the first frame ("start frame") of the sequence to enable the correct ordering of data during decoding.

DESCRIPTION OF EMBODIMENTS OF THE INVENTION

According to a first embodiment of the present invention there is provided a method of encoding sequence information into a sequence of display frames for display on a display device, the method comprising the steps of: generating the sequence of display frames; inserting monitor flags within each display frame, each monitor flag being capable of moving between a first state and a second state; setting the state of monitor flags within each display frame to a predetermined configuration; encoding sequence information in the sequence of display frames by varying the predetermined configuration throughout the sequence of display frames such that neighbouring display frames in the sequence have different predetermined configurations.

The first embodiment of the present invention provides a method of encoding sequence information into a sequence of display frames that are to be displayed on a display device. Sequence information according to this embodiment of the invention is encoded by inserting monitor flags into each display frame that can be set to a first or a second state. By configuring the monitor flags in each frame into a predetermined configuration, sequence information can effectively be encoded into the sequence of display frames. It is noted that the monitor flags may comprise further states, in addition to the first and second states, that could be used to encode further sequence information.

Conveniently the present invention may be used where the display device is used to display a changing grid pattern to convey information from the display device (e.g. video display) to an image capture device (e.g. a mobile telecommunications device equipped with a camera).

Conveniently, where a two dimensional grid of cells that switch between first and second states are displayed, the monitor flags may comprise cells in the grid. For example, the grid may comprise four monitor flags. A number of configurations of monitor flags within the grid are possible. For example, the flags may be located together, in the middle of a grid edge or at the corners of the grid. Conveniently, it is noted that by locating the monitor flags in the corner of the grid the likelihood of all the monitor flags being affected by transmission errors is reduced and that the placement of the flags in the corners of the grid allows use with all grid dimensions. Conveniently, monitor flags are grouped in pairs with each flag in a pair being located on the same horizontal scanline such that refresh errors can be detected.

Conveniently a first predetermined configuration is defined in which all monitor flags are in the same state, e.g. all in the first state, and a second predetermined configuration is defined in which all the monitor flags are in the opposite state, e.g. all in the second state. The sequence of the display frames may therefore conveniently be encoded into the sequence by alternating the predetermined configuration of neighbouring frames between the first and second predetermined configurations.

Conveniently, the start and end of the sequence may be associated with their own predetermined configurations to enable a decoding device to determine when a sequence begins and ends.

According to a second embodiment of the present invention there is provided a method of determining sequence information for a received sequence of display frames wherein each display frame comprises monitor flags capable of moving between a first and a second state, the state of the monitor flags in each frame being arranged into a predetermined configuration and sequence information being encoded in the sequence of display frames by arranging for neighbouring display frames in the sequence to have different predetermined configurations, the method comprising the steps of: receiving the sequence of display frames; identifying monitor flags within each received display frame; determining the state of monitor flags within each received frame in order to derive sequence information for the received sequence of display frames.

The second embodiment of the present invention provides a decoding method for determining sequence information from a received sequence of display frames in which each display frame comprises monitor flags that may be set to a first or second state and in which the state of the monitor flags in each frame are set to a predetermined configuration which varies throughout the sequence. In the method according to the second embodiment of the present invention the frame sequence is received and then analysed to identify the monitor flags. By determining the state of flags in each frame sequence information can be derived for the sequence.

In the event that the sequence of frames has a start and an end frame, the start and end frames may conveniently be encoded with different predetermined start and end configurations which are then identified in the above determining step.

In order to identify successive frames in the sequence, neighbouring frames may conveniently be encoded with different predetermined configurations. For example, neighbouring frames may alternate between a first predetermined configuration and a second predetermined configuration and the determining step may comprise determining that neighbouring frames have alternating configurations of monitor flags.

According to a third embodiment of the present invention there is provided a method of determining the presence of errors in a received sequence of display frames, the sequence of display frames being associated with known sequence information, the method comprising: determining sequence information for the received sequence of display frames according to the method of the second embodiment of the present invention; comparing the sequence information for the received sequence of display frames with the known sequence information in order to determine the presence of errors in the received sequence The third embodiment of the present invention provides a method of determining the presence of errors in a sequence of display frames. Sequence information is first determined according to the method of the second embodiment of the present invention. The sequence information for the received sequence of display frames can then be compared to the expect sequence information and departures from the expected sequence information can be used to determine various error conditions.

In the event that neighbouring display frames are encoded such that they alternate between first and second predetermined configurations, then the presence of a missing frame may be inferred in the event that two neighbouring received frames have the same predetermined configuration.

Depending on the display device and the device used to capture the sequence of display frames it is possible that some received frames may be partially refreshed frames, i.e. they comprise sequence information from two different display frames. Conveniently, the presence of such partially refreshed frames may be determined if a received display frame comprises portions of predetermined configurations from neighbouring display frames according to the known sequence information.

Conveniently, the presence of garbled frames in the received sequence of display frames may be determined if the sequence information for the received display frame does not correspond to any portion of the known sequence information.

In both the second and third embodiments of the present invention duplicate display frames, i.e. frames where the content encoded within the display frame has not updated from the previously received display frame, may be discarded.

According to a fourth embodiment of the present invention there is provided an encoder for encoding sequence information into a sequence of display frames for display on a display device comprising: inputs for receiving a sequence of display frames; a processor arranged to encode sequence information into the sequence of display frames; outputs arranged to output the encoded sequence of display frames to the display device wherein the processor is arranged to (i) insert monitor flags into each display frame within the sequence, each monitor flag being capable of moving between a first state and a second state; (ii) set the state of monitor flags within each display frame to a predetermined configuration, and; (iii) to encode sequence information in the sequence of display frames by varying the predetermined configuration throughout the sequence of display frames such that neighbouring display frames in the sequence have different predetermined configurations.

According to a fifth embodiment of the present invention there is provided a decoder for determining sequence information for a received sequence of display frames, the decoder comprising: inputs for receiving the sequence of display frames, wherein each display frame comprises monitor flags capable of moving between a first and a second state, the state of the monitor flags in each frame being arranged into a predetermined configuration and sequence information being encoded in the sequence of display frames by arranging for neighbouring display frames in the sequence to have different predetermined configurations; a processor arranged to identify monitor flags within each received display frame; outputs for outputting sequence information wherein the processor is arranged to determine the state of monitor flags within each received frame in order to derive sequence information for the received sequence of display frames.

According to a sixth embodiment of the present invention there is provided a decoder for determining the presence of errors in a received sequence of display frames, the sequence of display frames being associated with known sequence information, the decoder comprising a content decoder according to the fifth embodiment of the present invention wherein the processor is arranged to determine sequence information for the received sequence of display frames and to compare the sequence information for the received sequence with the known sequence information in order to determine the presence of errors in the received sequence.

It is noted that preferred features relating to the fourth, fifth and sixth embodiments of the present invention are described above in relation to the first, second and third embodiments of the invention In the above described decoder embodiments, once the decoder has determined sequence information and error information it may output an appropriate notification signal (e.g. that the correct sequence has been determined or that there are errors in the received sequence). The decoder may also output a control signal to an error correction module that may then utilise the derived sequence and error information to compensate for errors in the received sequence of display frames.

The invention extends to a display system comprising a display device and an encoder according to the fourth embodiment of the invention, and to a content capture system comprising a decoder according to the fifth and sixth embodiments of the invention and a content capture device.

Therefore, according to a seventh embodiment of the present invention there is provided a display system comprising a display device and an encoder for encoding sequence information into a sequence of display frames for display on a display device comprising: inputs for receiving a sequence of display frames; a processor arranged to encode sequence information into the sequence of display frames; outputs arranged to output the encoded sequence of display frames to the display device wherein the processor is arranged to (i) insert monitor flags into each display frame within the sequence, each monitor flag being capable of moving between a first state and a second state; (ii) set the state of monitor flags within each display frame to a predetermined configuration, and; (iii) to encode sequence information in the sequence of display frames by varying the predetermined configuration throughout the sequence of display frames such that neighbouring display frames in the sequence have different predetermined configurations wherein the outputs of the encoder are in communication with the display device.

According to a eighth embodiment of the present invention there is provided a content capture system comprising a content capture device and a decoder for determining sequence information for a received sequence of display frames, the decoder comprising: inputs for receiving the sequence of display frames, wherein each display frame comprises monitor flags capable of moving between a first and a second state, the state of the monitor flags in each frame being arranged into a predetermined configuration and sequence information being encoded in the sequence of display frames by arranging for neighbouring display frames in the sequence to have different predetermined configurations; a processor arranged to identify monitor flags within each received display frame; outputs for outputting sequence information wherein the processor is arranged to determine the state of monitor flags within each received frame in order to derive sequence information for the received sequence of display frames wherein the inputs of the decoder are in communication with the display device.

According to a ninth embodiment of the present invention there is provided a content capture system comprising a content capture device and a decoder for determining the presence of errors in a received sequence of display frames, the sequence of display frames being associated with known sequence information, the decoder comprising: inputs for receiving the sequence of display frames, wherein each display frame comprises monitor flags capable of moving between a first and a second state, the state of the monitor flags in each frame being arranged into a predetermined configuration and sequence information being encoded in the sequence of display frames by arranging for neighbouring display frames in the sequence to have different predetermined configurations; a processor arranged to identify monitor flags within each received display frame; outputs for outputting sequence information wherein the processor is arranged to determine the state of monitor flags within each received frame in order to derive sequence information for the received sequence of display frames, wherein the inputs of the decoder are in communication with the display device and wherein the processor is arranged to determine sequence information for the received sequence of display frames and to compare the sequence information for the received sequence with the known sequence information in order to determine the presence of errors in the received sequence.

The invention may also be expressed as a carrier medium comprising a computer program to implement the methods according to the first, second and third embodiments of the present invention Therefore, according to a further embodiment of the present invention there is provided a carrier medium for controlling a computer, processor or mobile telecommunications device to encode sequence information into a sequence of display frames for display on a display device, the carrier medium carrying computer readable code comprising: a code segment for generating the sequence of display frames; a code segment for inserting monitor flags within each display frame, each monitor flag being capable of moving between a first state and a second state; a code segment for setting the state of monitor flags within each display frame to a predetermined configuration; and a code segment for encoding sequence information in the sequence of display frames by varying the predetermined configuration throughout the sequence of display frames such that neighbouring display frames in the sequence have different predetermined configurations.

Therefore, according to a yet further embodiment of the present invention there is provided a carrier medium for controlling a computer, processor or mobile telecommunications device to determine sequence information for a received sequence of display frames wherein each display frame comprises monitor flags capable of moving between a first and a second state, the state of the monitor flags in each frame being arranged into a predetermined configuration and sequence information being encoded in the sequence of display frames by arranging for neighbouring display frames in the sequence to have different predetermined configurations, the carrier medium carrying computer readable code comprising: a code segment for receiving the sequence of display frames; identifying monitor flags within each received display frame; and a code segment for determining the state of monitor flags within each received frame in order to derive sequence information for the received sequence of display frames.

Therefore, according to a still further embodiment of the present invention there is provided a carrier medium for controlling a computer, processor or mobile telecommunications device to determine the presence of errors in a received sequence of display frames, the sequence of display frames being associated with known sequence information the carrier medium carrying computer readable code comprising: a code segment for determining sequence information for the received sequence of display frames according to the code of the yet further embodiment of the present invention; comparing the sequence information for the received sequence of display frames with the known sequence information in order to determine the presence of errors in the received sequence

BRIEF DESCRIPTION OF THE DRAWINGS

In order that the invention may be more readily understood, reference will now be made, by way of example, to the accompanying drawings in which.

DETAILED DESCRIPTION

Figure 1:
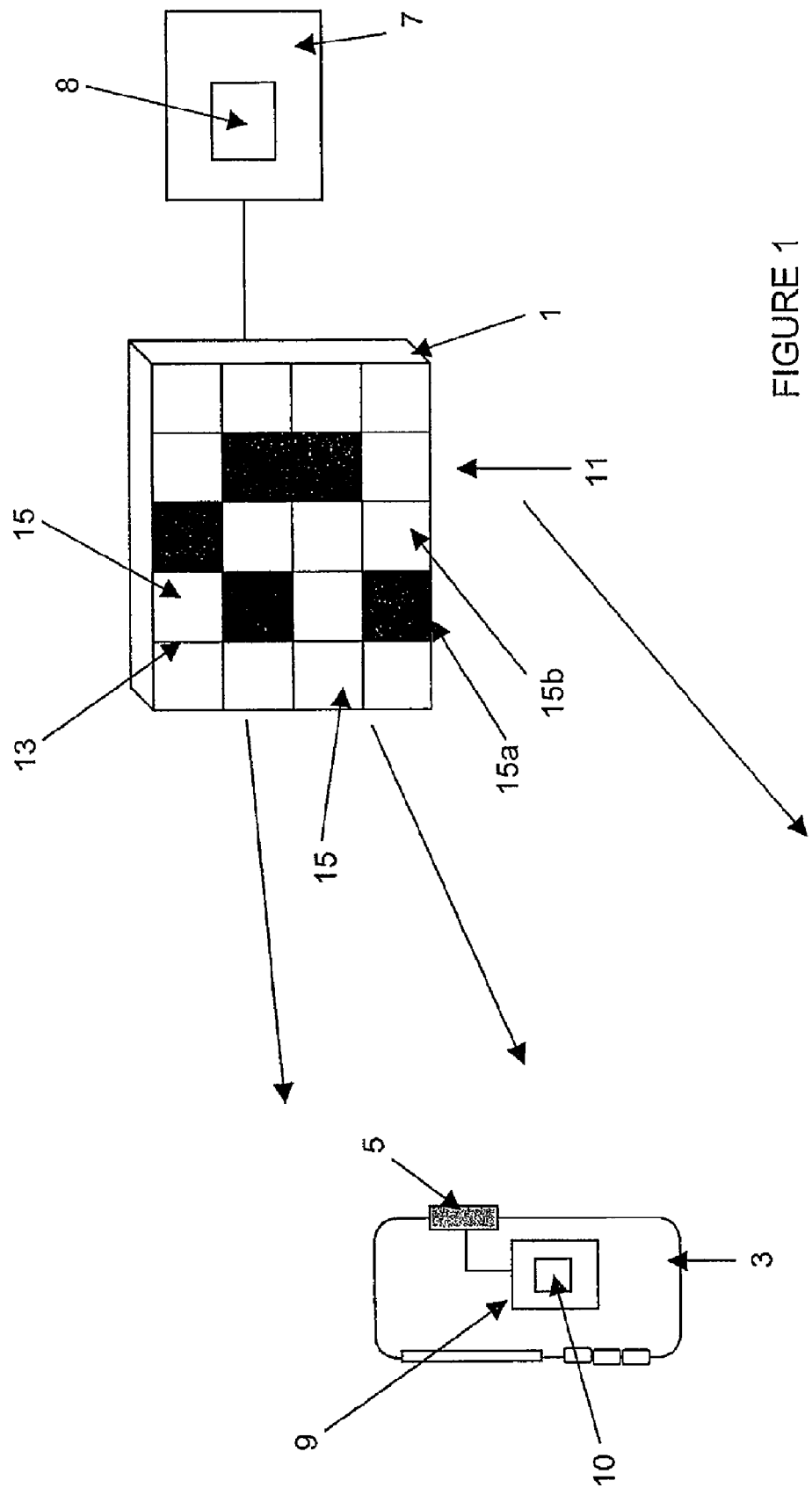
FIG. 1 shows image display and image capture devices in accordance with an embodiment of the present invention.

FIG. 1 shows an image display device 1 and an image capture device 3 in accordance with an embodiment of the present invention.

The image display device 1 may, for example, be a computer or television screen, a digital poster display or any other type of video display screen.

The image capture device 3 depicted in the present embodiment is a mobile telecommunications device comprising a camera 5. However, any image capture device capable of receiving and recording a visual image may be used.

The image display device 1 is controlled by a content encoder 7 which comprises a processor 8. The content encoder 7 is arranged, via the processor 8, to encode content that is input into the content encoder 7 into an image for display by the image display device 1. The content encoder may be a dedicated PC or may be a computer server or other distributed terminal that is in communication with the image display device via the Internet (or other network).

The image capture device 3 comprises the camera 5 and also a content decoder 9. The content decoder comprises a processor 10. The content decoder 9 is arranged, via its processor 10, to decode content from the images captured by the camera 5.

As shown in FIG. 1, content is represented by a rectangular pattern of light displayed on the image display device 1. It is noted however that content may be represented by other patterns of light, e.g. hexagonal. Conveniently, the pattern is one which may be tessellated.

In FIG. 1, the display device 1 is displaying a grid 13 of cell regions 15. Cell regions are, in this embodiment of the invention, capable of moving from a first state 15a and a second state 15b.

Cells in the first state may, for example, be of a higher luminosity than cells in the second state. In FIG. 1, however, cells in the first state are indicated by shaded/dark cells 15a. Cells in the second state are indicated unshaded/light cells 15b.

Since cells 15 may be in one of two different states the pattern/grid 13 is capable of encoding binary data.

It is noted that although FIG. 1 depicts cells 15 as being either shaded (15a) or unshaded (15b), the data may also be encoded within an arbitrary image by raising or lowering the luminosity of grid cells within the image.

Figure 2:
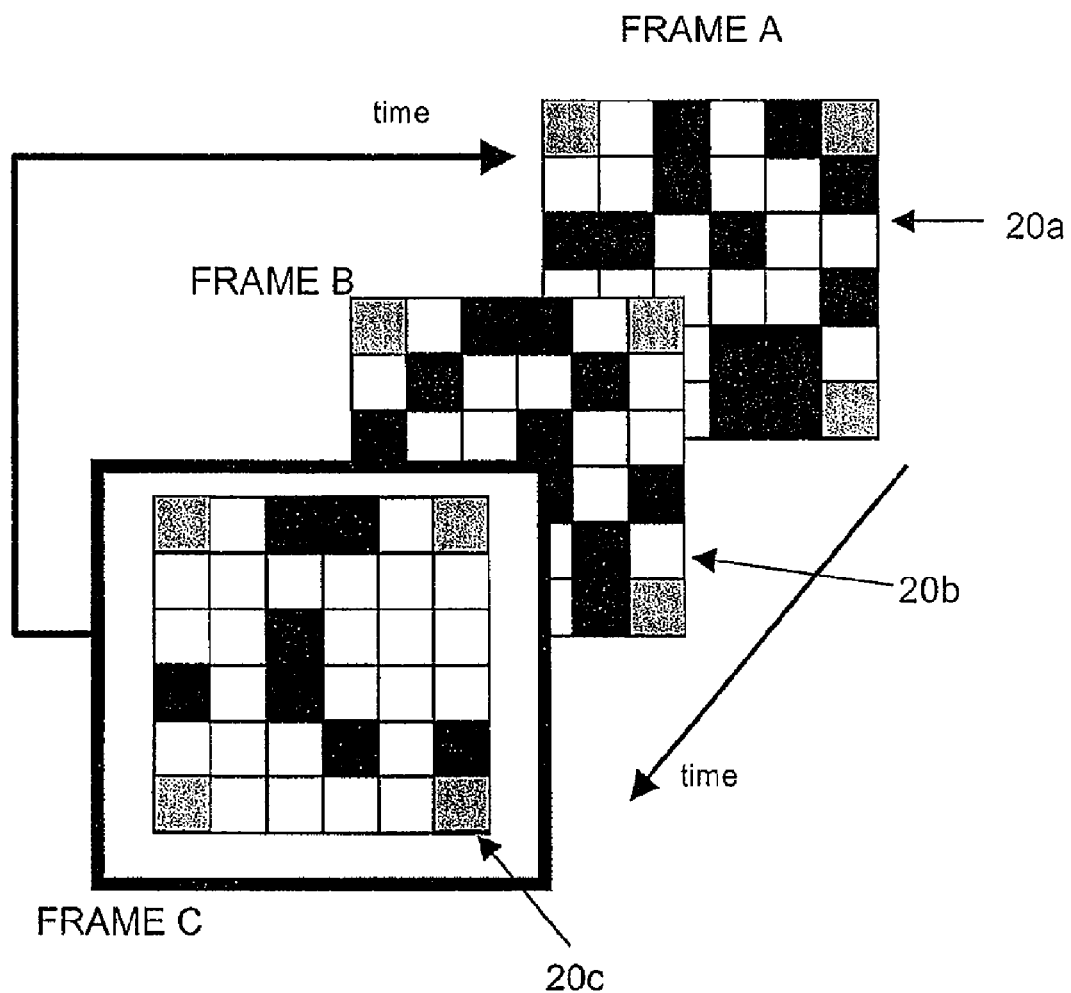
FIG. 2 illustrates examples of display frames displayed by the display device of FIG. 1.

In cases where it is desired to send content that exceeds the ability of a single grid 13 to encode all the data, a changing grid pattern may be used to convey information from the display device 1 to the image capture device 3. Such a changing grid pattern is depicted in FIG. 2 in which three successive display frames (Frame A, Frame B and Frame C) are shown.

Each of the display frames (A, B and C) comprises a different two dimensional grid pattern (20a, 20b, 20c) which are displayed in a continuous cycle by the image display device 1.

In use, the transmission channel between the display device 1 and the image capture device 5 is likely to introduce transmission errors into images captured by the camera 5.

Figure 3:
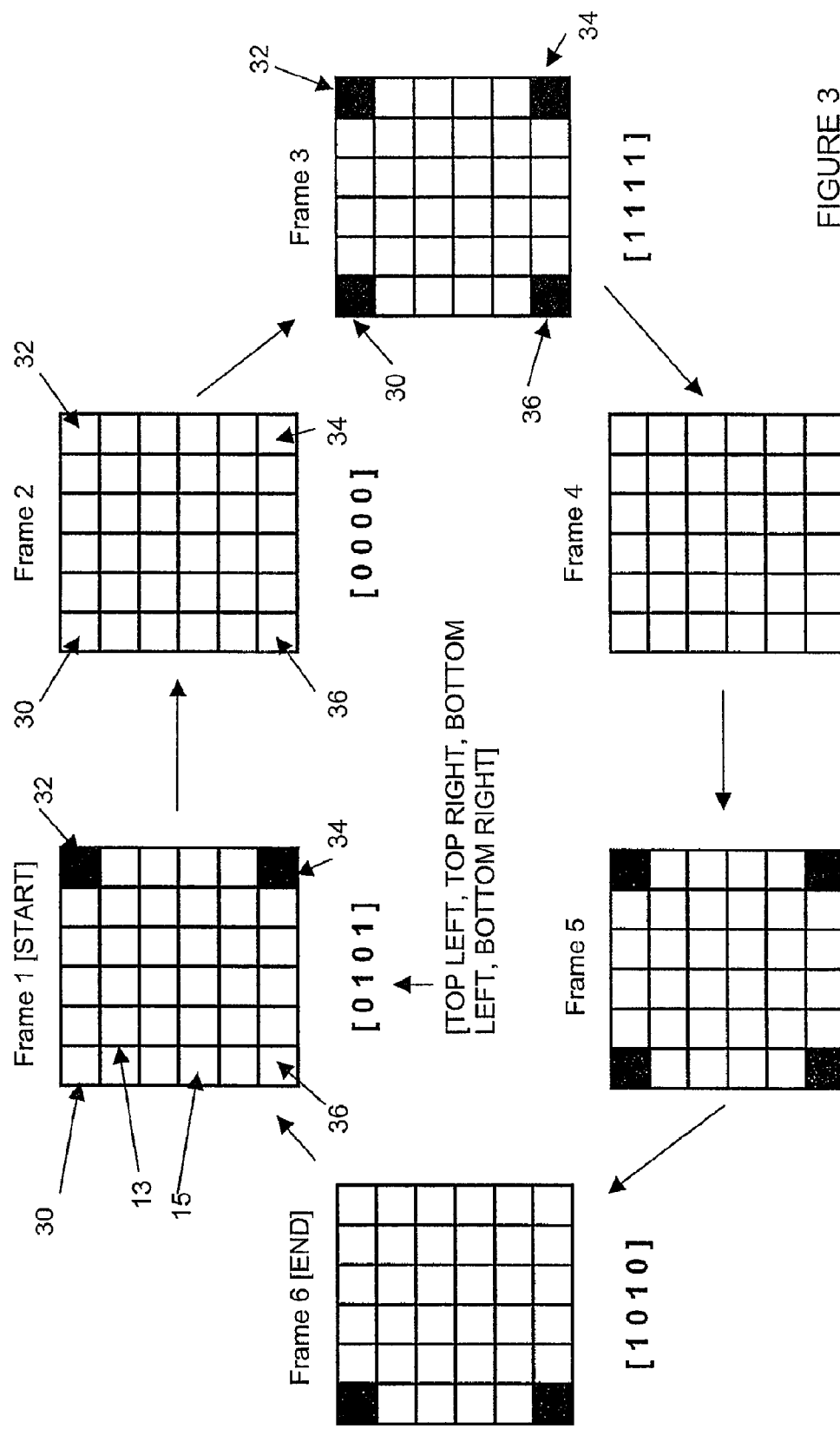
FIG. 3 illustrates a sequence of display frames in accordance with an embodiment of the present invention.

An encoding process in accordance with an embodiment of the present invention providing a mechanism for detecting certain transmission error cases and also for signalling the start and end of a sequence of display frames that are displayed in a continuous cycle is described in relation to FIG. 3.

FIG. 3 shows a sequence of six display frames (Frames 1, 2, 3, 4, 5 and 6). Each display frame comprises a grid 13 of cells 15 similar to those described in relation to FIGS. 1 and 2. For the sake of clarity however the majority of cells 15 are shown empty. The sequence of six display frames of FIG. 3 are displayed on the image display device 1 in a continuous cycle such that Frame 1 follows Frame 6.

As described above, frames in the sequence may be lost or become corrupted due to transmission errors. A mismatch between the image display device 1 refresh rate and the camera 5 capture rate may also result in partially refreshed display frames being captured by the image capture device 5.

The presently described embodiment of the invention provides a mechanism for determining the ordering of display frames and also a mechanism for detecting the start and end of the cycle.

The display frames shown in FIG. 3 comprise a number of "monitor flags" that are used to monitor the received sequence of images. In the presently described embodiment, these monitor flags are provided by cells within the grid 13. The monitor flags in the present embodiment are also referred to as "monitor cells" and, as shown in FIG. 3, are the top left cell 30 in the grid 13, the top right cell 32, the bottom left cell 34 and the bottom right cell 36.

These monitor cells (30, 32, 34, 36) are reserved for sequence identification purposes and are not used to transmit data/content information. Since cells 15 in the grid 13 are capable of moving between two states, the state of the monitor cells may be used to encode sequence information within the sequence of display frames.

As shown in FIG. 3, the configuration of all the monitor cells in a given display frame is shown beneath the cell in the format [top left, top right; bottom left, bottom right]. In Frame 2 for example, each monitor cell is in its "low" luminosity state and the configuration is shown as [0 0; 0 0]. In Frame 3, however, each monitor cell is in its "high" luminosity state and the configuration of the monitor cells in the frame is therefore shown as [1 1; 1 1].

In order to detect the start and end of the sequence, the processor 8 of the content encoder 7 is arranged to use the configuration signal [1 0; 1 0] to indicate the end frame, Frame 6, and to use the configuration signal [0 1; 0 1] to indicate the start frame, Frame 1.

In order to detect dropped frame, partial frame refresh and garbled frame captures in the received frame sequence, the processor 8 of the content encoder 7 is arranged to toggle the status of monitor cells in neighbouring image frames (other than the start and end frames) between a [0 0; 0 0] configuration and a [1 1; 1 1] configuration.

This "toggling" of the monitor cell configurations begins, in FIG. 3, with [0 0; 0 0] for Frame 2, [1 1; 1 1] for Frame 3, [0 0; 0 0] for Frame 4 etc.

The complete sequence for the continuous cycle depicted in FIG. 3 is therefore Frame 4- [0 0; 0 0]

Frame 5- [1 1; 1 1]

Frame 6- [1 0; 1 0]<< END>>

Frame 1- [0 1; 0 1]<< START>>

Frame 2- [0 0; 0 0]

Frame 3- [1 1; 1 1]

The above monitor flag/cell configurations represent predetermined configurations which are known to the content decoder 9. Anomalies in the above sequence, as detected by the content decoder 9, allow the various error cases described above to be detected. Detection of the start and end signals allows the start and end of the cycle to be detected (thereby allowing the content decoder 9 to notify a user when the complete message sequence has been received).

Figure 4:
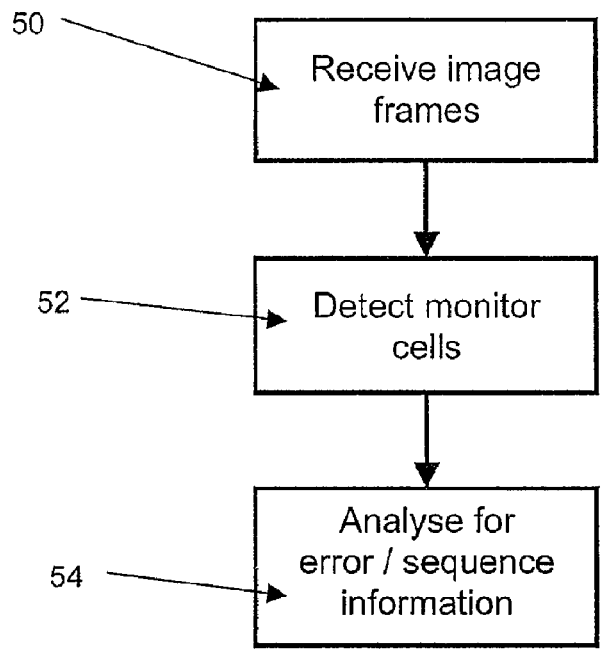
FIG. 4 is a flow chart depicting the decoding process in accordance with an embodiment of the present invention.

FIG. 4 is a flow chart of a basic decoding process in accordance with an embodiment of the present invention.

In Step 50, the image capture device is pointed at the image display device and a sequence of display frames are captured.

In Step 52, the processor 10 of the content decoder 9 analyses each display frame and detects the monitor cells.

In Step 54, the configuration of the monitor cells is determined by the processor 10 such that sequence information and error information can be determined. In particular, if the content decoder 9 processes two consecutive frames with an identical configuration of monitor cells, e.g. [0 0; 0 0] followed by [0 0; 0 0] then an odd number of frames must have been dropped. In practice, unless the camera frame rate is much lower than the animation rate of the display device 1, just one frame will be dropped.

If the content decoder 9 processes two consecutive frames with [0 0; 1 1] or [1 1; 0 0], then the display must have been only partially refreshed when the camera 5 sampled its image, due to the refresh scanline bisecting the display whilst traveling from the top to the bottom of the screen. Depending on the configuration of the monitor cells of the previous frame, it may be possible to detect that an odd number of frames has also been dropped e.g. [0 0; 0 0] followed by [1 1; 0 0], or [1 1; 1 1] followed by [0 0; 1 1]-again, in practice this is often a just single frame. Similarly, the codes [1 0; 0 1] and [0 1; 0 0] indicate a partial screen refresh local to the end and start frames.

The configuration of monitor cell states detailed below will not be transmitted, and if detected by the content decoder 9 indicate a corrupted frame.

[1 0; 0 0]

[0 0; 1 0]

[0 0; 0 1]

[0 1; 1 0]

[1 1; 1 0]

[1 1; 0 1]

[1 0; 1 1]

[0 1; 1 1]

In the embodiment of FIG. 4 the image display device may display any sequence of images. Embodiments of the present invention may conveniently be used, however, in situations where a changing grid pattern is used to convey information from a raster video display to a camera at high speed.

In a further embodiment, the image display device may display a two dimensional grid of fluctuating brightness patterns. In a second further embodiment the image display device may encode data within an arbitrary source image by raising or lowering the luminosity of grid cells (i.e. the grid of fluctuating patterns of brightness may be encoded within the source image).

Figure 5:
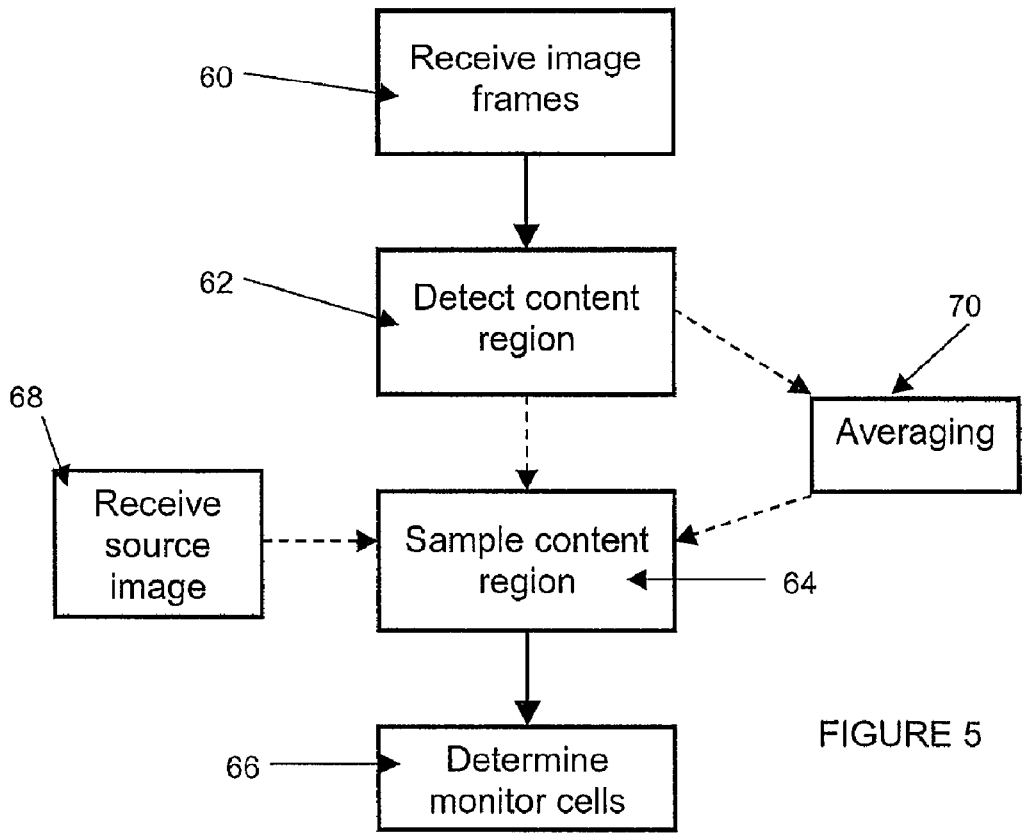
FIG. 5 is a flow chart depicting a decoding process in accordance with further embodiments of the present invention.

FIG. 5 is a flow chart detailing the decoding process according to these two further embodiments of the invention.

In the first further embodiment, the content decoder 9 performs the following steps:

i) In Step 60, the image capture device captures the sequence of images.

ii) In Step 62, for each display frame recorded by the camera 5, the region of the image comprising encoded content is detected and the region is cropped and warped to a rectilinear basis. The region is rotated 0, 90, 180 or 270 degrees as necessary to correctly orient the image.

iii) In Step 64, the image region identified in Step 62 is analysed to recover the grid pattern.

iv) In Step 66, the monitor cells within the grid pattern of each display frame are identified and the processor 10 of the content decoder 9 determines whether there are any errors in the received sequence of images. The start and end of the sequence is also determined.

In the second further embodiment the progression from Step 62 to Step 64 requires that the content decoder 9 removes the source image from the received display frames in order to recover the grid pattern of fluctuating brightness patterns. This may be achieved in one of two ways. In Step 68, an unmodulated copy of the source image is received by the content decoder 9 which is then subtracted from the sequence of display frames received in Step 60 to recover the grid pattern. Alternatively, in Step 70 the content decoder 9 averages a number of received image frames in order to determine the source image.

In each of the above described embodiments, once the decoder 9 has determined sequence information and error information it may output an appropriate notification signal (e.g. that the correct sequence has been determined or that there are errors in the received sequence). The decoder may also output a control signal to an error correction module that may then utilise the derived sequence and error information to compensate for errors in the received sequence of display frames.

It will be understood that the embodiments described above are given by way of example only and are not intended to limit the invention, the scope of which is defined in the appended claims. It will also be understood that the embodiments described may be used individually or in combination.

It is noted that the embodiment of FIG. 3 shows the monitor flags located in the corner of the grid pattern. However, it will be appreciated that the monitor flags could be located in a different location within the grid. For example, for a grid with an odd number of cells in each of its dimensions, the monitor cells could be located in the middle of each grid edge. Alternatively, the monitor cells could be located in neighbouring grid cells.

The invention claimed is:

1. A method of encoding sequence information into a sequence of display frames for display on a display device, the method comprising the steps of:
   generating the sequence of display flames;
   inserting monitor flags within each display frame, each monitor flag being capable of moving between a first state and a second state;
   setting the state of monitor flags within each display frame to a predetermined configuration;
   encoding sequence information in the sequence of display frames by varying the predetermined configuration throughout the sequence of display frames such that successive neighbouring display frames in the sequence have different predetermined configurations;
   wherein each display frame comprises a rectilinear grid and a monitor flag is located in each corner of the grid.

2. A method as claimed in claim 1, wherein the display frames comprise a two dimensional grid of cells, each cell being capable of moving between a first and a second state.

3. A method as claimed in claim 2, wherein the monitor flags comprise cells within the grid.

4. A method as claimed in claim 1, wherein the method further comprises defining a first predetermined configuration in which each monitor flag within a display frame is in its first state and defining a second predetermined configuration in which each monitor flag within a display frame is in its second state.

5. A method as claimed in claim 4, wherein the encoding step comprises alternating the predetermined configuration of successive display frames between the first and second predetermined configurations.

6. A method as claimed in claim 1, wherein the sequence of display frames has a start frame and an end frame and the method further comprises defining a start configuration for the state of monitor flags and setting the monitor flags in the start frame to the start configuration and defining an end configuration for the state of monitor flags and setting the state of monitor flags in the end frame to the end configuration.

7. A method of determining sequence information for a received sequence of display frames wherein each display frame comprises monitor flags capable of moving between a first and a second state, the state of the monitor flags in each frame being arranged into a predetermined configuration and sequence information being encoded in the sequence of display frames by arranging for successive neighbouring display frames in the sequence to have different predetermined configurations, the method comprising the steps of:
   receiving the sequence of display frames;
   identifying monitor flags within each received display frame;
   determining the state of monitor flags within each received display frame in order to derive sequence information for the received sequence of display frames;
   wherein each display frame comprises a rectilinear grid and a monitor flag is located in each corner of the grid.

8. A method as claimed in claim 7, wherein the sequence of display frames comprises a start display frame and an end display frame, the start and end display frames having different predetermined configurations and the determining step comprises analysing the sequence information for the received sequence of display frames and identifying the presence of the predetermined configurations corresponding to the start and end display frames.

9. A method as claimed in claim 7, wherein the sequence of image frames is arranged such that neighbouring display frames in the sequence have different predetermined configurations and the determining step comprises determining that successive frames have different predetermined configurations.

10. A method as claimed in claim 9, wherein the sequence of image frames is arranged such that the neighbouring display frames alternate between a first predetermined configuration and a second predetermined configuration and the determining step comprises determining that neighbouring display frames alternate between the first and second predetermined configurations.

11. A method of determining the presence of errors in a received sequence of successive neighbouring display frames, the sequence of display frames being associated with known sequence information, the method comprising
   determining sequence information for the received sequence of display frames according to the method of claim 7;
   comparing the sequence information for the received sequence of display frames with the known sequence information in order to determine the presence of errors in the received sequence.

12. A method as claimed in claim 11, wherein the sequence of image frames is arranged such that neighbouring display frames in the sequence have different predetermined configurations and the determining step comprises determining that successive frames have different predetermined configurations and wherein the comparing step comprises determining if neighbouring display frames have different predetermined configurations and determining the presence of errors in the received sequence of display frames if any neighbouring display frames as received in the receiving step have identical predetermined configurations.

13. A method as claimed in claim 11, wherein the sequence of image frames is arranged such that neighbouring display frames in the sequence have different predetermined configurations and the determining step comprises determining that successive frames have different predetermined configurations and wherein the comparing step comprises determining that a received display frame is partially complete if it comprises portions of predetermined configurations from neighbouring display frames.

14. A method as claimed in claim 11, wherein the sequence of image frames is arranged such that neighbouring display frames in the sequence have different predetermined configurations and the determining step comprises determining that successive frames have different predetermined configurations and wherein the comparing step comprises determining that a received display frame is corrupted if the sequence information for that display frame does not correspond to any portion of the known sequence information.

15. A method as claimed in claim 7, wherein the display frames comprise content data and the method further comprises the step of comparing the content data in a current display frame with the content data contained within the immediately preceding display frame in the sequence and discarding the current display frame if the content data is identical or substantially similar to the content data in the immediately preceding display frame.

* * * * *

UNITED STATES PATENT AND TRADEMARK OFFICE
CERTIFICATE OF CORRECTION

| | | |
|---|---|---|
| PATENT NO. | : 8,180,163 B2 | Page 1 of 1 |
| APPLICATION NO. | : 12/179935 | |
| DATED | : May 15, 2012 | |
| INVENTOR(S) | : John Collomosse et al. | |

It is certified that error appears in the above-identified patent and that said Letters Patent is hereby corrected as shown below:

On the Title page, in Item (57), Abstract, in column 2, line 9, delete "display frames" and insert -- display frames by varying the predetermined configuration throughout the sequence of display frames --, therefor.

In column 10, line 47, in Claim 1, delete "flames;" and insert -- frames; --, therefor.

In column 12, line 7, in Claim 11, after "comprising" insert -- : --.

Signed and Sealed this
Eleventh Day of December, 2012

David J. Kappos
*Director of the United States Patent and Trademark Office*